E. BUGATTI.
SHOCK ABSORBER FOR VEHICLES.
APPLICATION FILED AUG. 26, 1913.
1,099,586.
Patented June 9, 1914.
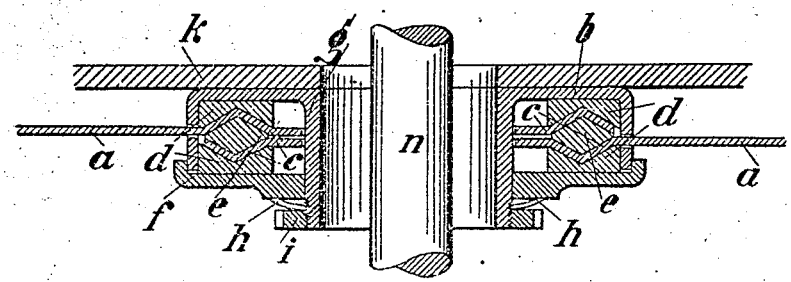
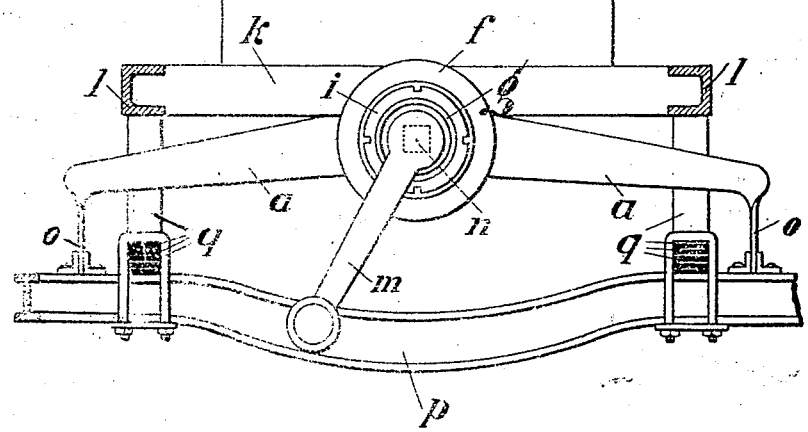

UNITED STATES PATENT OFFICE.

ETTORE BUGATTI, OF MOLSHEIM, GERMANY.

SHOCK-ABSORBER FOR VEHICLES.

1,099,586.  Specification of Letters Patent.  Patented June 9, 1914.

Application filed August 26, 1913. Serial No. 786,812.

*To all whom it may concern:*

Be it known that I, ETTORE BUGATTI, a subject of the King of Italy, and residing at Molsheim, Alsace-Lorraine, Germany, have invented certain new and useful Improvements in Shock-Absorbers for Vehicles, of which the following is a specification.

The present invention has reference to improvements in shock absorbers for vehicles, and relates more particularly to the construction, arrangement and coöperation of parts, as will hereinafter be described and claimed in the appended claims.

The well known shock absorbers, consisting of relatively yieldable friction members, are now used generally one for each wheel. According to the present invention this number is cut down to two, by positioning the shock absorbers in such manner that their axis extends in the vertical longitudinal center plane of the vehicle.

In order to make this invention more readily understood, I will now describe it with reference to the accompanying drawing, in which—

Figure 1 shows a cross-section through the device, and Fig. 2 a front view of same, in position on the vehicle.

The shock reducer essentially consists of a cylindrical housing $b$ with lateral cut-outs, journaling two annularly troughed disks $c$ with arms $a$ laterally extending through these cut-outs. The disks face one another with their hollows and coöperate with the friction members $d$, $e$, contoured according to the respective disk surfaces. As shown, the housing is provided with a central passage for the shaft $n$ of the crank handle $m$, and the friction parts are of correspondingly annular shape. The cover or cap $f$ of the housing can be displaced on the inner cylindrical wall $g$ toward, or away from, the outer friction member $d$ by means of a nut $i$ threading on the front end of the wall cylinder $g$, and a spring $h$ is interposed between nut and cap. The housing is suitably secured to a cross member $k$ of the vehicle frame $l$, and the outer ends of the absorber arms $a$ are bent downward and are twisted as at $o$, and are directly secured to the cross-axle $p$ of the vehicle. Laminated springs $q$ are interposed between the cross-axle and the vehicle frame proper.

What I claim is:

1. The combination with a vehicle frame, a cross-axle, and springs interposed between said frame and said axle, of a shock absorber, located midway of said cross-axle, comprising two centrally perforated, annularly troughed friction disks, laterally extending arms thereon with down-turned and twisted outer ends, annular friction members, an annular housing inclosing said friction parts, and means for controlling the friction pressure between these latter parts, said twisted absorber arms being secured to said cross-axle and said housing being secured to the vehicle frame.

2. A shock absorber for vehicles, comprising a cylindrical housing with lateral cut-outs, annularly troughed friction disks therein, a lateral arm on each of said disks extending outwardly through said cut-outs and angularly bent and twisted near the outer end, said friction disks facing each other with their hollows, friction members coöperating respectively with the outer and inner faces of said disks, and adjustable means for controlling the friction pressure between said friction parts.

In testimony whereof I affix my signature in presence of two witnesses.

ETTORE BUGATTI.

Witnesses:
MILO A. JEWETT,
JOSEPH ROHMER.